(12) United States Patent
Kao et al.

(10) Patent No.: US 10,538,018 B2
(45) Date of Patent: Jan. 21, 2020

(54) METHOD FOR MANUFACTURING ELASTIC MAT WITH SUCCESSIVE MIXED COLOR TYPE

(71) Applicant: Simple Green Co., Ltd., Huatan Township, Changhua County (TW)

(72) Inventors: Chen-I Kao, Huatan Township (TW); Shang-Chieh Kao, Huatan Township (TW); Shu-Chen Huang, Huatan Township (TW); Hsueh-Fang Kao, Douliu (TW); Yung-Ping Lai, Xihu Township (TW)

(73) Assignee: Simple Green Co., Ltd., Changhua County (TW)

( * ) Notice: Subject to any disclaimer, the term of this patent is extended or adjusted under 35 U.S.C. 154(b) by 355 days.

(21) Appl. No.: 15/656,187

(22) Filed: Jul. 21, 2017

(65) Prior Publication Data
US 2018/0079117 A1 Mar. 22, 2018

(30) Foreign Application Priority Data

Sep. 20, 2016 (TW) .............................. 105130308 A (51) Int. Cl.
*B29C 48/08* (2019.01)
*B29C 48/17* (2019.01)
(Continued)

(52) U.S. Cl.
CPC ............ *B29C 43/265* (2013.01); *B29C 43/46* (2013.01); *B29C 43/52* (2013.01); *B29C 44/30* (2013.01);
(Continued)

(58) Field of Classification Search
CPC ................ D06N 7/0028; D06N 7/0034; B32B 2307/402; B32B 2307/404; B29C 43/24; B29C 43/30; B29C 43/46; B29C 43/467; B29C 48/08; B29C 48/16; B29C 48/17; B29C 48/175; B29C 48/18; B29C 48/185; B29C 48/19; B29C 48/20; B29C 48/22; B29C 65/00; B29C 65/02; B29C 65/18;
(Continued)

(56) References Cited

U.S. PATENT DOCUMENTS

| 1,603,813 | A | * | 10/1926 | Stein ...................... B29C 43/24 156/501 |
| 1,612,724 | A | * | 12/1926 | Housekeeper ........ B29C 43/222 264/76 |

(Continued)

*Primary Examiner* — Philip C Tucker
*Assistant Examiner* — Brian R Slawski
(74) *Attorney, Agent, or Firm* — Alan D. Kamrath; Mayer & Williams PC (57) ABSTRACT

A method includes processing multiple macromolecular staples to successively produce a macromolecular sheet body, multiple silks and multiple sheet particles. The macromolecular sheet body contains multiple district camouflages and is processed by edge cutting to form multiple color strips. The color strips, the silks and the sheet particles are processed and attached to the surface of the macromolecular sheet body, so that the surface of the macromolecular sheet body forms the district camouflages, the thread camouflages and the spot camouflages. Finally, the macromolecular sheet body is vulcanized or solidified in a foam molding zone, to form an elastic mat with a mixed color type.

10 Claims, 6 Drawing Sheets

(51) Int. Cl.
- *B29C 48/19* (2019.01)
- *B29C 48/20* (2019.01)
- *B29C 48/22* (2019.01)
- *B29C 43/24* (2006.01)
- *B29C 43/30* (2006.01)
- *B29C 65/00* (2006.01)
- *B29C 65/02* (2006.01)
- *B32B 37/00* (2006.01)
- *B29C 43/26* (2006.01)
- *B29C 43/46* (2006.01)
- *B29C 43/52* (2006.01)
- *B29C 44/30* (2006.01)
- *B29C 44/34* (2006.01)
- *B29K 21/00* (2006.01)
- *B29K 105/04* (2006.01)

(52) U.S. Cl.
CPC .......... *B29C 44/3415* (2013.01); *B29C 43/24* (2013.01); *B29C 48/08* (2019.02); *B29C 48/17* (2019.02); *B29C 48/19* (2019.02); *B29C 48/20* (2019.02); *B29C 48/22* (2019.02); *B29C 65/02* (2013.01); *B29C 66/435* (2013.01); *B29C 66/4722* (2013.01); *B29K 2021/00* (2013.01); *B29K 2105/04* (2013.01); *B29K 2995/0021* (2013.01); *B29K 2995/0046* (2013.01); *B32B 2307/404* (2013.01)

(58) Field of Classification Search
CPC ......... B29C 66/00; B29C 66/40; B29C 66/41; B29C 66/43; B29C 66/435; B29C 66/47; B29C 66/472; B29C 66/4722
USPC .... 156/60, 63, 91, 92, 93, 242, 243, 244.11, 156/244.18, 244.24, 246, 250, 256, 258, 156/259, 269, 271, 297, 299, 300, 302, 156/303, 308.2, 309.6, 324; 428/57, 58, 428/61, 542.2, 542.6, 919; 427/180, 201; 264/145, 146, 148, 152, 175
See application file for complete search history.

(56) References Cited

U.S. PATENT DOCUMENTS

| | | | | |
|---|---|---|---|---|
| 1,663,275 | A * | 3/1928 | Mell | B29C 48/175 264/75 |
| 2,390,712 | A * | 12/1945 | Houlder | D06N 7/0028 428/48 |
| 3,194,859 | A * | 7/1965 | Wacker | D06N 7/0028 264/122 |
| 6,103,161 | A * | 8/2000 | Lopez | B29C 48/30 264/148 |
| 2005/0146069 | A1* | 7/2005 | Kanan | B29C 43/24 264/76 |
| 2008/0199679 | A1* | 8/2008 | Rost | B32B 3/14 428/304.4 |
| 2016/0361847 | A1* | 12/2016 | Ishida | B29C 43/245 |

* cited by examiner

METHOD FOR MANUFACTURING ELASTIC MAT WITH SUCCESSIVE MIXED COLOR TYPE

BACKGROUND OF THE INVENTION

1. Field of the Invention

The present invention relates to a method for manufacturing foam material and, more particularly, to a method for manufacturing an elastic mat.

2. Description of the Related Art

A conventional method for making a rubber foam comprises a successive extruding method and a hot-press forming method. The successive extruding method includes kneading a rubber stock, extruding the kneaded rubber stock into a rubber sheet by an extruding machine, delivering the rubber sheet into a vulcanization foam box by a transmission belt of a conveyor, and vulcanizing and foaming the rubber sheet into a rubber foam. The hot-press forming method includes heating and pressing a rubber stock by a die so as to form a rubber foam. However, the conventional rubber foam product only has a single color, so that it is monotonous and lacks variation of colors, thereby decreasing the aesthetic quality thereof. Thus, the conventional rubber foam product cannot attract the consumers and cannot satisfy the requirement of the market.

BRIEF SUMMARY OF THE INVENTION

The primary objective of the present invention is to provide a method for manufacturing an elastic mat with a successive mixed color type.

In accordance with the present invention, there is provided a method for manufacturing an elastic mat, comprising:

a first step a) preparing multiple macromolecular staples of different colors in a first processing zone, applying a determined pressure on the macromolecular staples to successively produce a macromolecular sheet body which has multiple district camouflages, and moving the macromolecular sheet body to a second processing zone;

a second step b) including providing a first coating deposit mixed district in the second processing zone, applying a determined pressure on the macromolecular sheet body, and moving the macromolecular sheet body to a third processing zone;

a third step c) including edge cutting the district camouflages of the macromolecular sheet body when the macromolecular sheet body is moved to the third processing zone to form multiple color strips of different colors, guiding the color strips to a fourth processing zone and a fifth processing zone, and guiding the color strips to the first processing zone and the third processing zone;

a fourth step d) including providing multiple second coating deposit mixed districts in the third processing zone, storing the color strips of the second processing zone in the second coating deposit mixed districts to attach the color strips to the macromolecular sheet body, applying a determined pressure on the color strips of the fourth processing zone to extrude multiple silks, ejecting the silks onto the second coating deposit mixed districts of the third processing zone to attach the silks to the macromolecular sheet body, rolling the macromolecular sheet body to dope the macromolecular sheet body with the silks, to present a thread diffusion state by the determined pressure of the third processing zone, and to form multiple thread camouflages on a surface of the macromolecular sheet body, so that the macromolecular sheet body contains the district camouflages and the thread camouflages;

a fifth step e) including applying a determined pressure on the macromolecular staples in the fifth processing zone to extrude and cut the macromolecular staples to form multiple sheet particles, ejecting the sheet particles onto the second coating deposit mixed districts of the third processing zone to attach the sheet particles to the macromolecular sheet body, to mix the sheet particles with the silks, to present a spot diffusion state by the determined pressure of the third processing zone, and to form multiple spot camouflages on the surface of the macromolecular sheet body, so that the macromolecular sheet body contains the district camouflages, the thread camouflages and the spot camouflages; and a sixth step f) including vulcanizing or solidifying the macromolecular sheet body in a foam molding zone, to form an elastic mat with a mixed color type.

In the first step a), the macromolecular sheet body presents different colors which extend in a longitudinal direction and are arranged in a transverse manner to form the district camouflages. In the second step b), the second processing zone has a determined temperature to control a softening degree of the macromolecular sheet body. In the fourth step d), the third processing zone has the determined temperature to control the softening degree of the macromolecular sheet body.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4 and 6, a method for manufacturing an elastic mat 1 in accordance with the preferred embodiment of the present invention comprises a first step a), a second step b), a third step c), a fourth step d), a fifth step e) and a sixth step f).

The first step a) includes preparing multiple macromolecular staples 10 of different colors in a first processing zone 2, applying a determined pressure on the macromolecular staples 10 to successively produce a macromolecular sheet body 11 which has multiple district camouflages 111, and moving the macromolecular sheet body 11 to a second processing zone 4. In the first step a), the macromolecular sheet body 11 presents different colors which extend in a longitudinal direction and are arranged in a transverse manner to form the district camouflages 111.

Figure 1:
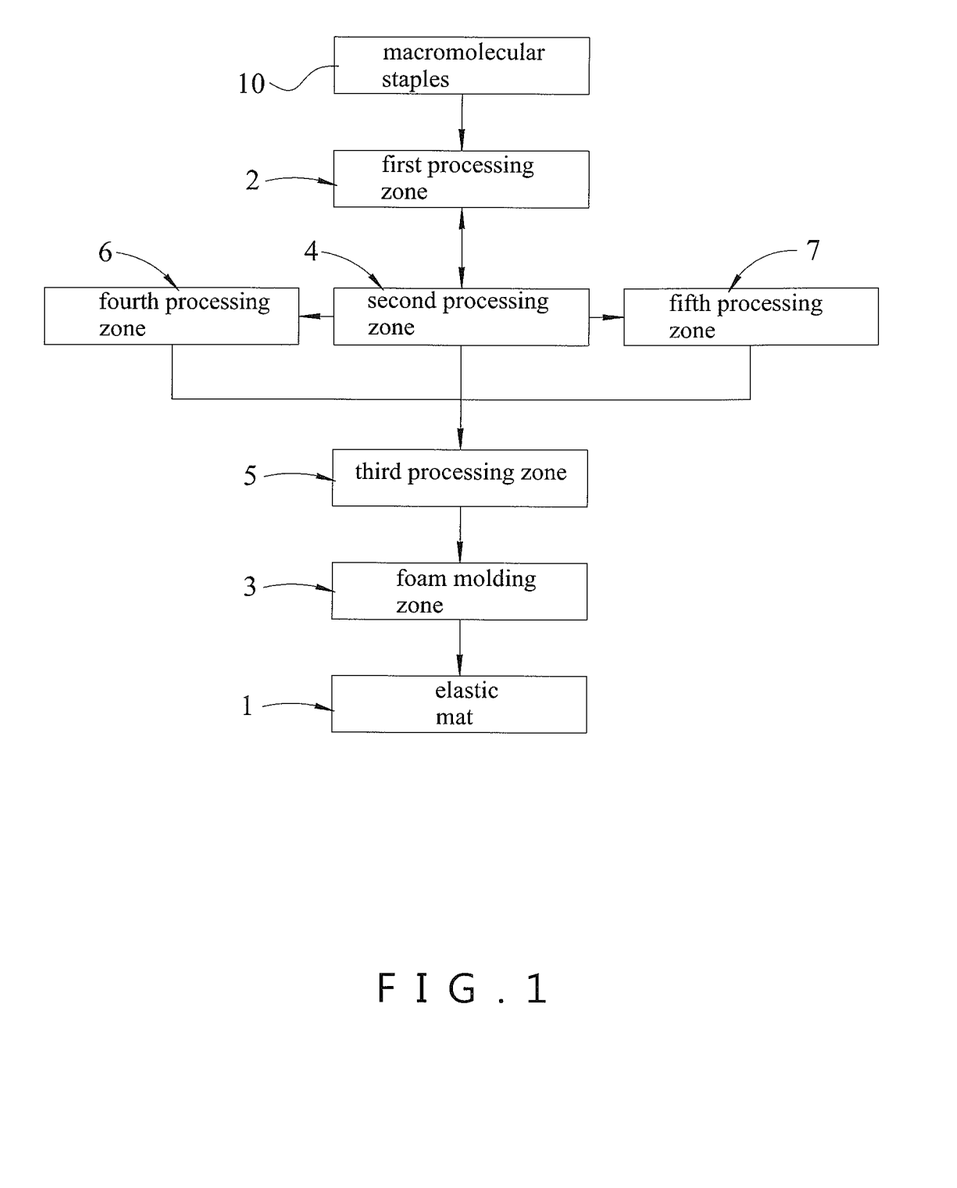
FIG. 1 is a block diagram of a method for manufacturing an elastic mat in accordance with the preferred embodiment of the present invention.
Figure 2:
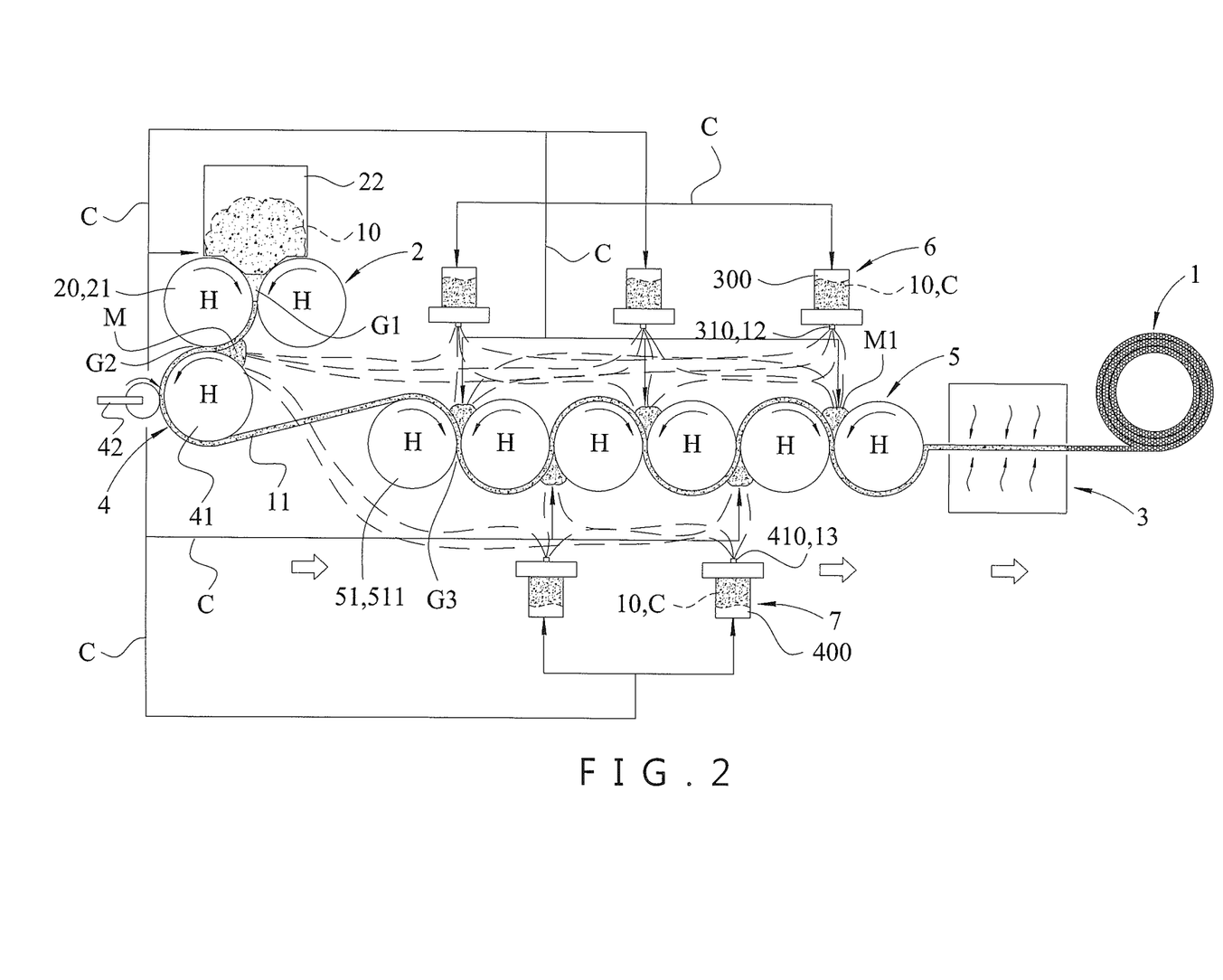
FIG. 2 is a schematic view showing a process of the method for manufacturing an elastic mat in accordance with the preferred embodiment of the present invention.
Figure 3:
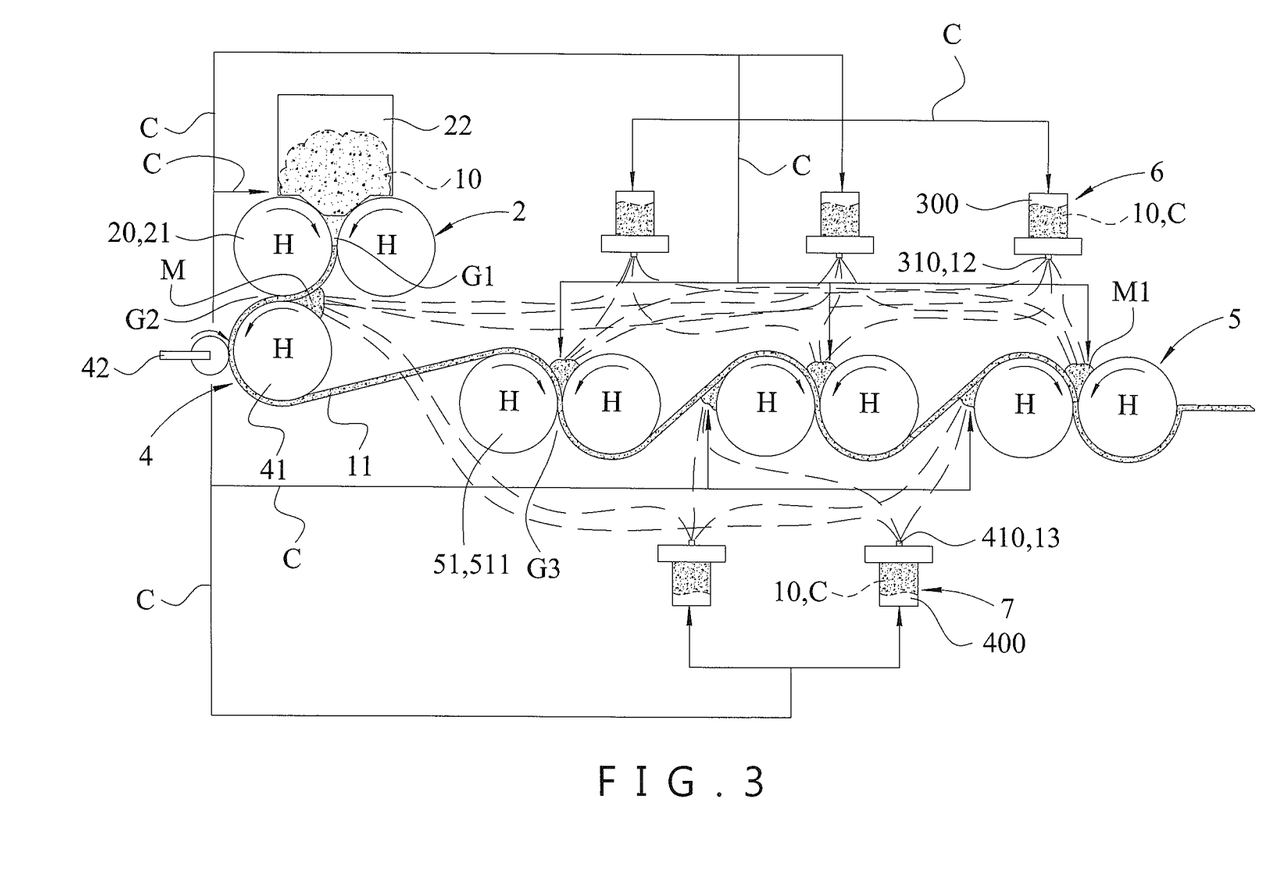
FIG. 3 is a schematic view showing a process of the method for manufacturing an elastic mat in accordance with another preferred embodiment of the present invention.

The second step b) includes providing a first coating deposit mixed district "M" in the second processing zone 4, applying a determined pressure on the macromolecular sheet body 11, and moving the macromolecular sheet body 11 to a third processing zone 5. In the second step b), the second processing zone 4 has a determined temperature "H" to control a softening degree of the macromolecular sheet body 11.

The third step c) includes edge cutting the district camouflages 111 of the macromolecular sheet body 11 when the macromolecular sheet body 11 is moved to the third processing zone 5 to form multiple color strips "C" of different colors, guiding the color strips "C" to a fourth processing zone 6 and a fifth processing zone 7, and guiding the color strips "C" to the first processing zone 2 and the third processing zone 5. In the third step c), the edge cutting is performed at an outer edge of the second processing zone 4.

The fourth step d) includes providing multiple second coating deposit mixed districts "M1" in the third processing zone 5, storing the color strips "C" of the second processing zone 4 in the second coating deposit mixed districts "M1" to attach the color strips "C" to the macromolecular sheet body 11, applying a determined pressure on the color strips "C" of the fourth processing zone 6 to extrude multiple silks 12, ejecting the silks 12 onto the second coating deposit mixed districts "M1" of the third processing zone 5 to attach the silks 12 to the macromolecular sheet body 11, rolling the macromolecular sheet body 11 to dope the macromolecular sheet body 11 with the silks 12, to present a thread diffusion state by the determined pressure of the third processing zone 5, and to form multiple thread camouflages 112 (see FIG. 6) on a surface of the macromolecular sheet body 11, so that the macromolecular sheet body 11 contains the district camouflages 111 and the thread camouflages 112. In the fourth step d), the third processing zone 5 has the determined temperature "H" to control the softening degree of the macromolecular sheet body 11.

The fifth step e) includes applying a determined pressure on the macromolecular staples 10 in the fifth processing zone 7 to extrude and cut the macromolecular staples 10 to form multiple sheet particles 13, ejecting the sheet particles 13 onto the second coating deposit mixed districts "M1" of the third processing zone 5 to attach the sheet particles 13 to the macromolecular sheet body 11, to mix the sheet particles 13 with the silks 12, to present a spot diffusion state by the determined pressure of the third processing zone 5, and to form multiple spot camouflages 113 (see FIG. 6) on the surface of the macromolecular sheet body 11, so that the macromolecular sheet body 11 contains the district camouflages 111, the thread camouflages 112 and the spot camouflages 113.

Figure 6:
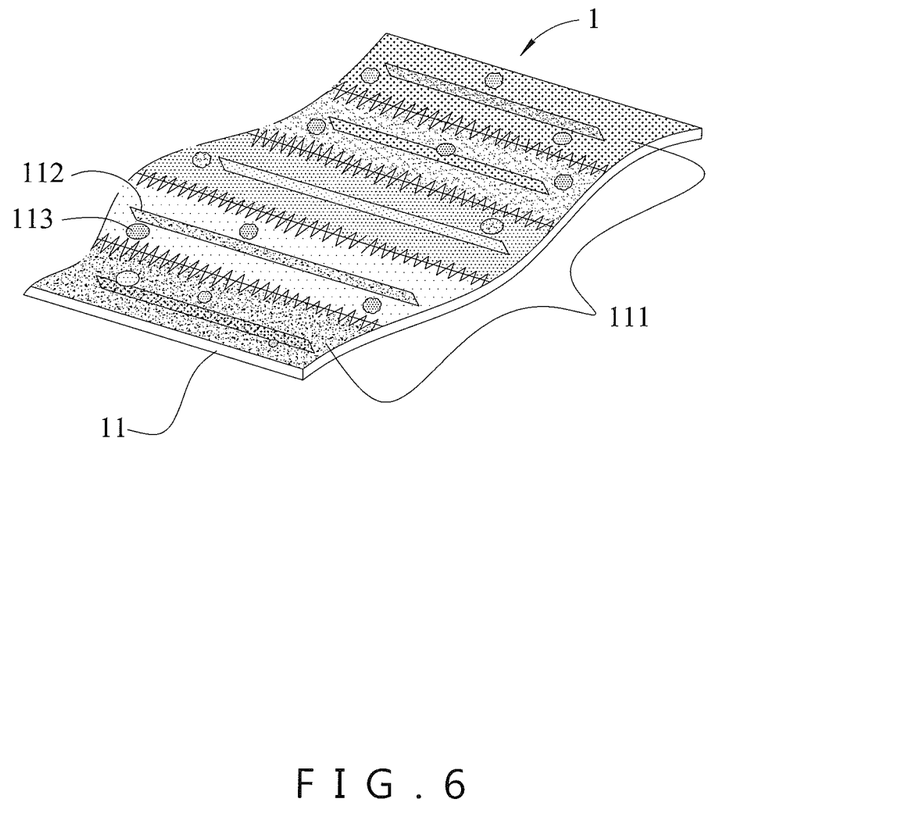
FIG. 6 is a partially perspective view of an elastic mat in accordance with the preferred embodiment of the present invention.

The sixth step f) includes vulcanizing or solidifying the macromolecular sheet body 11 in a foam molding zone 3, to form an elastic mat 1 with a mixed color type. The elastic mat 1 contains the district camouflages 111, the thread camouflages 112 and the spot camouflages 113 as shown in FIG. 6.

Figure 4:
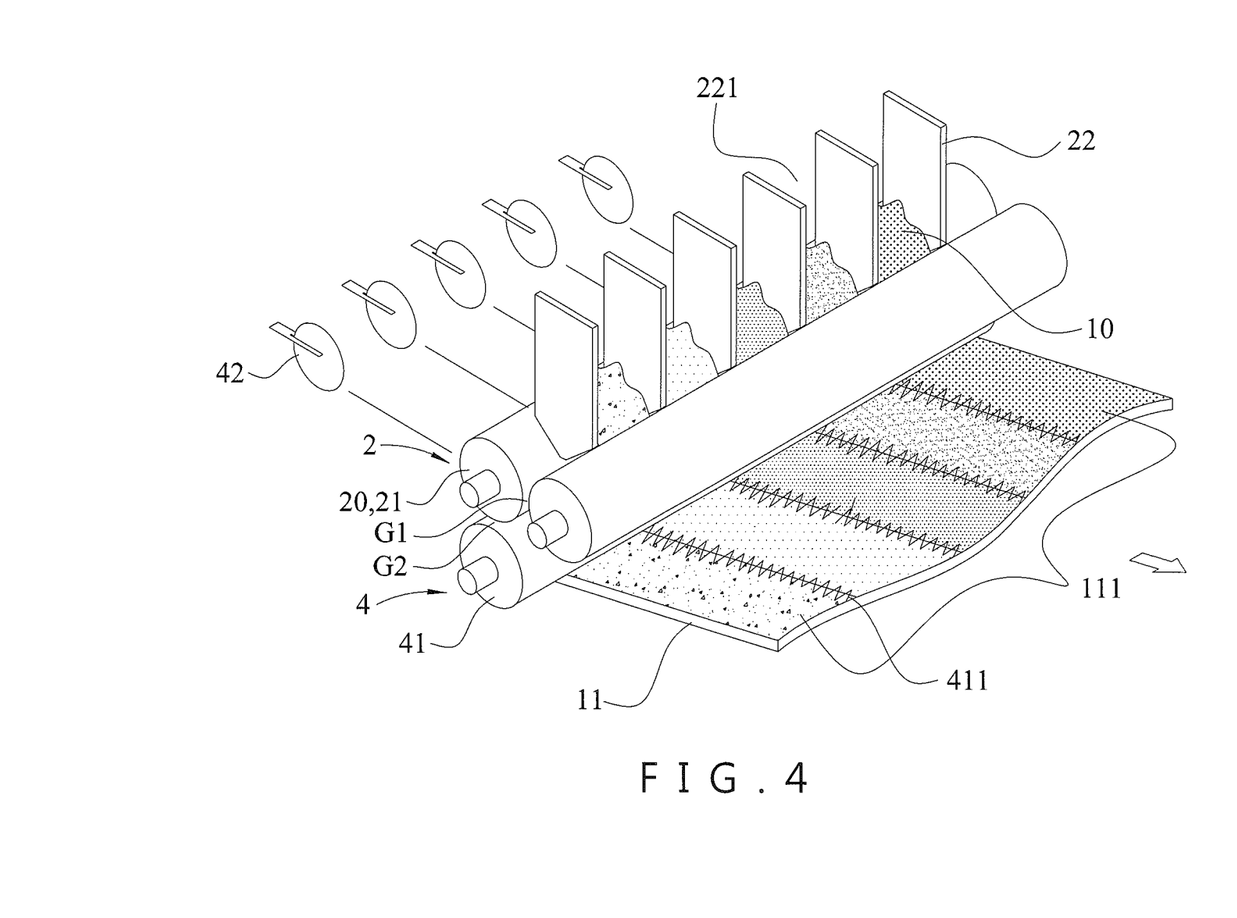
FIG. 4 is a locally enlarged perspective view of a first processing zone as shown in FIG. 2.

In the preferred embodiment of the present invention, in the first step a), the first processing zone 2 includes a roller press sheet device 20 including two extrusion members 21 rotated in opposite directions, an adjustable first gap "G1" defined between the two extrusion members 21, multiple stop plates 22 arranged above the two extrusion members 21, and multiple color feeding areas 221 defined between the stop plates 22 to allow entrance of the macromolecular staples 10. Each of the two extrusion members 21 is a roller and has the determined temperature "H". The second processing zone 4 includes a roller 41 having the determined temperature "H", multiple ribbons 411 of different colors placed on the roller 41, and an adjustable second gap "G2" defined between the roller 41 and one of the two extrusion members 21. The second gap "G2" is adjusted to determine the mixing degree of the edge of the ribbons 411.

In practice, the two extrusion members 21 are rotated in opposite directions to carry the macromolecular staples 10 to pass through the first gap "G1", so that the macromolecular staples 10 are pressed successively by the two extrusion members 21 to form the macromolecular sheet body 11. The first gap "G1" is adjusted by changing the distance between the two extrusion members 21 to determine the thickness of the macromolecular sheet body 11. The first coating deposit mixed district "M" of the second processing zone 4 is located at the second gap "G2". The roller 41 of the second processing zone 4 is rotated to drive and move the macromolecular sheet body 11 toward the third processing zone 5. When the macromolecular sheet body 11 is pressed between the roller 41 of the second processing zone 4 and one of the two extrusion members 21, the ribbons 411 of the roller 41 are attached to the surface of the macromolecular sheet body 11. The second processing zone 4 further includes multiple cutters 42 located beside the roller 41. The cutters 42 are rotated to perform the edge cutting action on the district camouflages 111 of the macromolecular sheet body 11 from the roller 41, so as to form the color strips "C".

In the preferred embodiment of the present invention, the third processing zone 5 includes multiple calender sets 51 for rolling the macromolecular sheet body 11. The calender sets 51 are adjacent as shown in FIG. 2 or are spaced equally from each other as shown in FIG. 3. Each of the calender sets 51 includes two calendering wheels 511 rotated in opposite directions, with a third gap "G3" being defined between the two calendering wheels 511. Each of the second coating deposit mixed districts "M1" of the third processing zone 5 is located at the respective third gap "G3". Each of the calendering wheels 511 has a periphery provided with convex and concave textures so that the surface of the macromolecular sheet body 11 presents convex and concave textures. Preferably, the textures of each of the calendering wheels 511 include flower patterns, stripes, corrugated patterns, characters, figures, cartoon models or trademarks. Thus, the elastic mat 1 contains the mixed color type and the texture type.

It is appreciated that, when the macromolecular sheet body 11 passes through each of the calender sets 51 of the third processing zone 5, the macromolecular sheet body 11 and the color strips "C", the silks 12 and the sheet particles 13 stored in the second coating deposit mixed districts "M1" of the third processing zone 5 are rolled and twisted by each of the calender sets 51 of the third processing zone 5, so that the color strips "C" are attached to the surface of the macromolecular sheet body 11. Preferably, the third gap "G3" is adjusted by changing the distance between the two calendering wheels 511 to control the mixing level of the color strips "C" stored in the second coating deposit mixed districts "M1" of the third processing zone 5 with the macromolecular sheet body 11.

In the preferred embodiment of the present invention, the fourth processing zone 6 includes at least one injection molding device 300 including an injection nozzle 310. The at least one injection molding device 300 stores, heats and melts the macromolecular staples 10 at a high temperature, and the injection nozzle 310 of the at least one injection molding device 300 injects the silks 12 which are further injected to the first coating deposit mixed district "M" of the second processing zone 4 and attached to the surface of the macromolecular sheet body 11. The second processing zone 4 applies a determined pressure on the silks 12 which are pressed to present a thread diffusion state and attached to the surface of the macromolecular sheet body 11, so that the surface of the macromolecular sheet body 11 contains the district camouflages 111 and the thread camouflages 112. When the color strips "C" formed in the second processing zone 4 are guided to the fourth processing zone 6, the color strips "C" are mixed with the macromolecular staples 10 as shown in FIG. 2.

In the preferred embodiment of the present invention, the fifth processing zone 7 includes at least one granulation extrusion device 400 including an injection nozzle 410. The at least one granulation extrusion device 400 stores and cuts the macromolecular staples 10, and the injection nozzle 410 of the at least one granulation extrusion device 400 injects the sheet particles 13 of irregular shapes. The sheet particles 13 are further injected to the first coating deposit mixed district "M" of the second processing zone 4 and attached to the surface of the macromolecular sheet body 11. The second processing zone 4 applies a determined pressure on the sheet particles 13 which are pressed to present a spot diffusion state and attached to the surface of the macromolecular sheet body 11, so that the surface of the macromolecular sheet body 11 contains the district camouflages 111 and the spot camouflages 113. When the color strips "C" formed in the second processing zone 4 are guided to the fifth processing zone 7, the color strips "C" are mixed with the macromolecular staples 10 as shown in FIG. 2.

It is appreciated that, the second gap "G2" is adjusted by changing the distance between the roller 41 and one of the two extrusion members 21, to control the mixing level of the color strips "C", the silks 12 and the sheet particles 13 stored in the first coating deposit mixed district "M" of the second processing zone 4 with the macromolecular sheet body 11.

Figure 5:
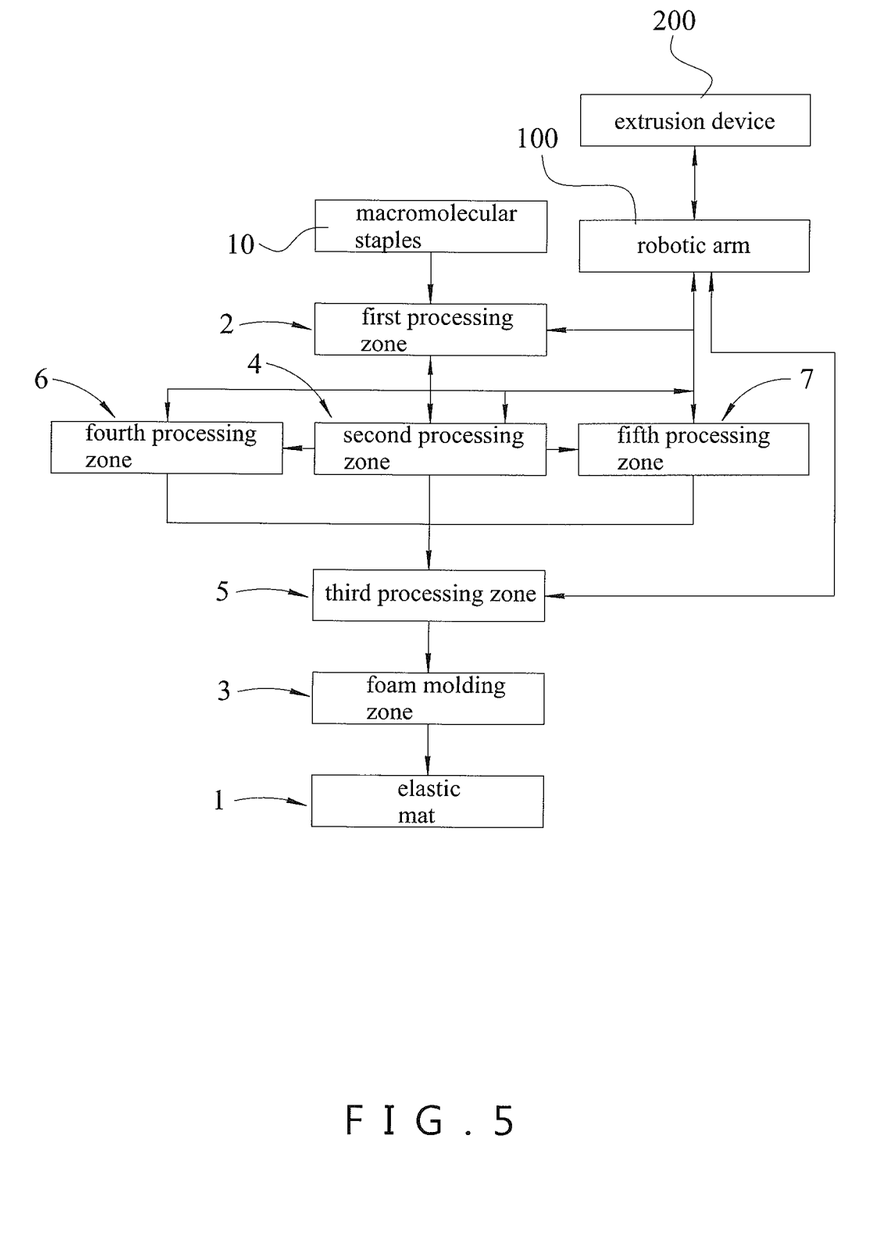
FIG. 5 is a block diagram of a method for manufacturing an elastic mat in accordance with another preferred embodiment of the present invention.

Referring to FIG. 5 with reference to 1-4, the first processing zone 2, the second processing zone 4, the third processing zone 5, the fourth processing zone 6 and the fifth processing zone 7 cooperate with at least one robotic arm 100. The at least one robotic arm 100 freely mixes and moves the macromolecular staples 10, the color strips "C", the silks 12 and the sheet particles 13 to the first coating deposit mixed district "M" of the second processing zone 4 and the second coating deposit mixed districts "M1" of the third processing zone 5 to be attached to the surface of the macromolecular sheet body 11. The second processing zone 4 and the third processing zone 5 apply a determined pressure to roll the macromolecular sheet body 11 with the macromolecular staples 10, the color strips "C", the silks 12 and the sheet particles 13, and have the determined temperature "H" to control the softening degree of the macromolecular sheet body 11, so that the macromolecular staples 10, the color strips "C", the silks 12 and the sheet particles 13 are mixed with the surface of the macromolecular sheet body 11, and the macromolecular sheet body 11 has a mixed color effect.

In the preferred embodiment of the present invention, the at least one robotic arm 100 arranges the macromolecular staples 10, the color strips "C", the silks 12 and the sheet particles 13 at different rotation angles in an alternating manner, and moves the macromolecular staples 10, the color strips "C", the silks 12 and the sheet particles 13 to the first coating deposit mixed district "M" of the second processing zone 4 and the second coating deposit mixed districts "M1" of the third processing zone 5 to be attached to the surface of the macromolecular sheet body 11. The first processing zone 2, the second processing zone 4, the third processing zone 5, the fourth processing zone 6 and the fifth processing zone 7 apply a determined pressure to roll the macromolecular sheet body 11 with the macromolecular staples 10, the color strips "C", the silks 12 and the sheet particles 13, so that the surface of the macromolecular sheet body 11 presents multiple lines and textures arranged in an alternating manner. In practice, the at least one robotic arm 100 revolves the color strips "C", the silks 12 and the sheet particles 13 at an angle of 30°, 60° or 90°, in an alternating manner, so as to solve the problem of directional array.

In the preferred embodiment of the present invention, the at least one robotic arm 100 moves the macromolecular staples 10, the color strips "C", the silks 12 and the sheet particles 13 to an extrusion device 200 for form a mixed lump. The extrusion device 200 extrudes the mixed lump to form a color sheet having a radial shape. The at least one robotic arm 100 moves the color sheet to the first coating deposit mixed district "M" of the second processing zone 4 and the second coating deposit mixed districts "M1" of the third processing zone 5 to be attached to the surface of the macromolecular sheet body 11. The second processing zone 4 and the third processing zone 5 apply a determined pressure to roll the macromolecular sheet body 11 with the color sheet, so that the surface of the macromolecular sheet body 11 presents irregular figures.

In the preferred embodiment of the present invention, the third step c), the fourth step d) and the fifth step e) are worked synchronously.

It is appreciated that, each of the macromolecular staples 10 is made of natural rubber, synthetic rubber, plastics or elastomer or a mixture of the natural rubber, the synthetic rubber, the plastics and the elastomer. Preferably, each of the macromolecular staples 10 includes, and is not limited to, Ethylene-vinyl acetate copolymer, styrene-butadiene rubber, polybutadiene rubber, isoprene rubber, nitrile rubber, acrylic rubber, silicon rubber, fluorocarbon rubber, thermoplastic rubber, EPDM rubber, Propylene-butadiene rubber, chloroprene rubber, polylactic acid, styrene-butadiene-styrene copolymer.

In addition, each of the macromolecular staples 10 is a macromolecular organic compound whose structure contains multiple repeated units, including a natural compound, a processed natural compound, or a fully synthetic compound. Alternatively, each of the macromolecular staples 10 includes various homopolymers or copolymers (including alternating copolymers, random copolymer or a graft copolymer).

In conclusion, in the method of the present invention, the macromolecular staples 10 are processed in the first processing zone 2, the second processing zone 4, the third processing zone 5, the fourth processing zone 6 and the fifth processing zone 7, to successively produce the macromolecular sheet body 11 with the district camouflages 111, the silks 12 and the sheet particles 13. The second processing zone 4 performs the edge cutting on the district camouflages 111 of the macromolecular sheet body 11 to form the color strips "C", and guides the color strips "C" to the first processing zone 2, the second processing zone 4, the third processing zone 5, the fourth processing zone 6 and the fifth processing zone 7, so that the color strips "C" are mixed with the silks 12 and the sheet particles 13. The color strips "C", the silks 12 and the sheet particles 13 are attached to the surface of the macromolecular sheet body 11 by action of the first processing zone 2, the second processing zone 4, the third processing zone 5, the fourth processing zone 6 and the fifth processing zone 7, so that the surface of the macromolecular sheet body 11 forms the district camouflages 111, the thread camouflages 112 and the spot camouflages 113 simultaneously. Finally, the macromolecular sheet body 11 is vulcanized or solidified in the foam molding zone 3, to form the elastic mat 1 with a mixed color type.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A method for manufacturing an elastic mat, comprising:
    a first step a) preparing multiple macromolecular staples of different colors in a first processing zone, applying pressure on the macromolecular staples to successively produce a macromolecular sheet body which has multiple district camouflages, and moving the macromolecular sheet body to a second processing zone;
    a second step b) including providing a first coating deposit mixed district in the second processing zone, applying pressure on the macromolecular sheet body, and moving the macromolecular sheet body to a third processing zone;
    a third step c) including edge cutting the district camouflages of the macromolecular sheet body at an outer edge of the second processing zone to form multiple color strips of different colors, guiding the color strips to a fourth processing zone and a fifth processing zone, and guiding the color strips to the first processing zone and the third processing zone;
    a fourth step d) including providing multiple second coating deposit mixed districts in the third processing zone, storing the color strips of the second processing zone in the second coating deposit mixed districts to attach the color strips to the macromolecular sheet body, applying pressure on the color strips of the fourth processing zone to extrude multiple silks, ejecting the silks onto the second coating deposit mixed districts of the third processing zone to attach the silks to the macromolecular sheet body, rolling the macromolecular sheet body to dope the macromolecular sheet body with the silks, to present a thread diffusion state by the pressure of the third processing zone, and to form multiple thread camouflages on a surface of the macromolecular sheet body, so that the macromolecular sheet body contains the district camouflages and the thread camouflages;
    a fifth step e) including applying pressure on the macromolecular staples in the fifth processing zone to extrude and cut the macromolecular staples to form multiple sheet particles, ejecting the sheet particles onto the second coating deposit mixed districts of the third processing zone to attach the sheet particles to the macromolecular sheet body, to mix the sheet particles with the silks, to present a spot diffusion state by the pressure of the third processing zone, and to form multiple spot camouflages on the surface of the macromolecular sheet body, so that the macromolecular sheet body contains the district camouflages, the thread camouflages and the spot camouflages; and
    a sixth step f) including vulcanizing or solidifying the macromolecular sheet body in a foam molding zone, to form an elastic mat with a mixed color type;
    wherein:
    in the first step a), the macromolecular sheet body presents different colors which extend in a longitudinal direction and are arranged in a transverse manner to form the district camouflages;
    in the second step b), the second processing zone has a determined temperature to control a softening degree of the macromolecular sheet body; and
    in the fourth step d), the third processing zone has the determined temperature to control the softening degree of the macromolecular sheet body.

2. The method of claim 1, wherein:
    the first processing zone includes a roller press sheet device including two extrusion members rotated in opposite directions, an adjustable first gap defined between the two extrusion members, multiple stop plates arranged above the two extrusion members, and multiple color feeding areas defined between the stop plates to allow entrance of the macromolecular staples;
    each of the two extrusion members has the determined temperature; and
    the second processing zone includes a roller having the determined temperature, multiple ribbons of different colors placed on the roller, and an adjustable second gap defined between the roller and one of the two extrusion members.

3. The method of claim 2, wherein the second processing zone further includes multiple cutters located beside the roller, and the cutters are rotated to perform the edge cutting on the district camouflages of the macromolecular sheet body from the roller.

4. The method of claim 1, wherein:
    the third processing zone includes multiple calender sets for rolling the macromolecular sheet body;
    the calender sets are adjacent or are spaced equally from each other;
    each of the calender sets includes two calendering wheels rotated in opposite directions, with a third gap being defined between the two calendering wheels; and
    each of the calendering wheels has a periphery provided with convex and concave textures so that the surface of the macromolecular sheet body presents convex and concave textures.

5. The method of claim 1, wherein:
    the fourth processing zone includes at least one injection molding device including an injection nozzle;
    the at least one injection molding device stores, heats and melts the macromolecular staples at a high temperature, and the injection nozzle of the at least one injection molding device injects the silks which are further injected to the first coating deposit mixed district of the second processing zone and attached to the surface of the macromolecular sheet body; and
    the second processing zone applies pressure on the silks which are pressed to present the thread diffusion state and attached to the surface of the macromolecular sheet body, so that the surface of the macromolecular sheet body contains the district camouflages and the thread camouflages.

6. The method of claim 1, wherein:
    the fifth processing zone includes at least one granulation extrusion device including a second injection nozzle;
    the at least one granulation extrusion device stores and cuts the macromolecular staples, and the second injection nozzle of the at least one granulation extrusion device injects the sheet particles;

the sheet particles are further injected to the first coating deposit mixed district of the second processing zone and attached to the surface of the macromolecular sheet body; and the second processing zone applies pressure on the sheet particles which are pressed to present the spot diffusion state and attached to the surface of the macromolecular sheet body, so that the surface of the macromolecular sheet body contains the district camouflages and the spot camouflages.

7. The method of claim 1, wherein:

the first processing zone, the second processing zone, the third processing zone, the fourth processing zone and the fifth processing zone cooperate with at least one robotic aim;

the at least one robotic arm freely mixes and moves the macromolecular staples, the color strips, the silks and the sheet particles to the first coating deposit mixed district of the second processing zone and the second coating deposit mixed districts of the third processing zone to be attached to the surface of the macromolecular sheet body; and the second processing zone and the third processing zone apply pressure to roll the macromolecular sheet body with the macromolecular staples, the color strips, the silks and the sheet particles, and have the determined temperature to control the softening degree of the macromolecular sheet body, so that the macromolecular staples, the color strips, the silks and the sheet particles are mixed with the surface of the macromolecular sheet body, and the macromolecular sheet body has a mixed color effect.

8. The method of claim 7, wherein:

the at least one robotic arm arranges the macromolecular staples, the color strips, the silks and the sheet particles at different rotation angles in an alternating manner, and moves the macromolecular staples, the color strips, the silks and the sheet particles to the first coating deposit mixed district of the second processing zone and the second coating deposit mixed districts of the third processing zone to be attached to the surface of the macromolecular sheet body; and the first processing zone, the second processing zone, the third processing zone, the fourth processing zone and the fifth processing zone apply pressure to roll the macromolecular sheet body with the macromolecular staples, the color strips, the silks and the sheet particles, so that the surface of the macromolecular sheet body presents multiple lines and textures arranged in an alternating manner.

9. The method of claim 8, wherein:

the at least one robotic arm moves the macromolecular staples, the color strips, the silks and the sheet particles to an extrusion device for forming a mixed lump;

the extrusion device extrudes the mixed lump to form a color sheet having a radial shape;

the at least one robotic arm moves the color sheet to the first coating deposit mixed district of the second processing zone and the second coating deposit mixed districts of the third processing zone to be attached to the surface of the macromolecular sheet body; and the second processing zone and the third processing zone apply pressure to roll the macromolecular sheet body with the color sheet, so that the surface of the macromolecular sheet body presents irregular figures.

10. The method of claim 1, wherein the third step c), the fourth step d) and the fifth step e) are worked synchronously.

\* \* \* \* \*